May 26, 1959
E. A. STALKER
2,888,241
FABRICATED COOLED TURBINE BLADES
Filed June 9, 1954
2 Sheets-Sheet 1
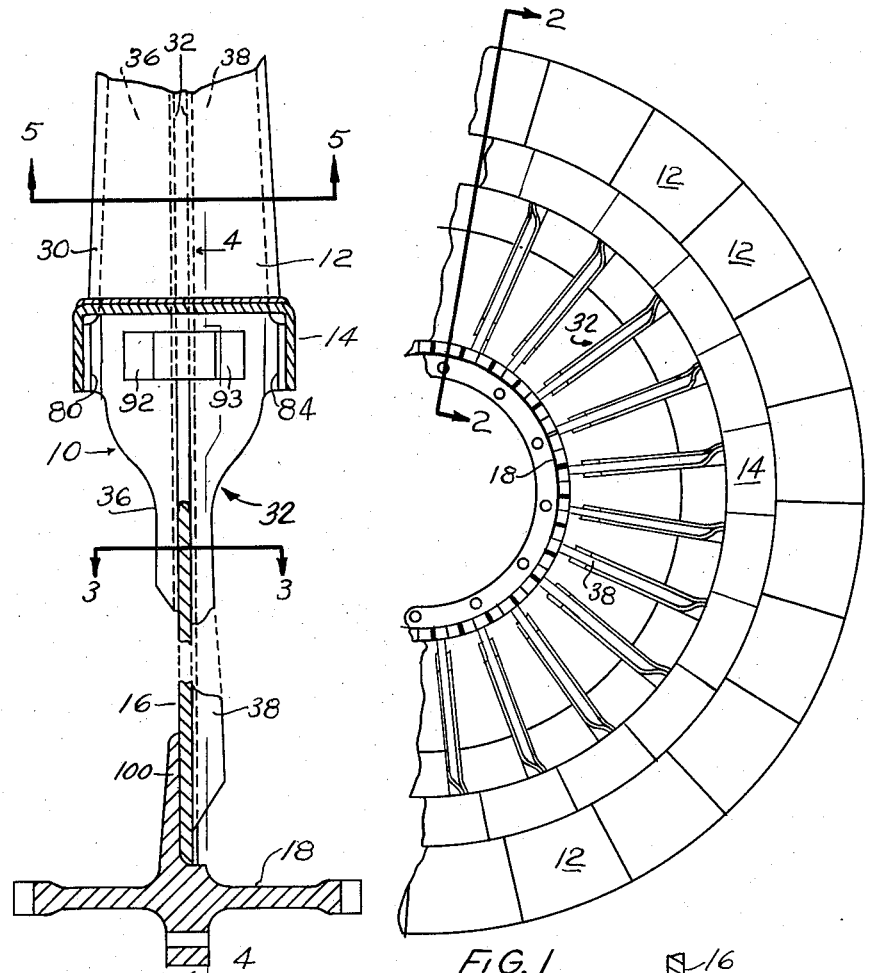
FIG. 1
FIG. 2
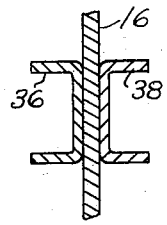
FIG. 3
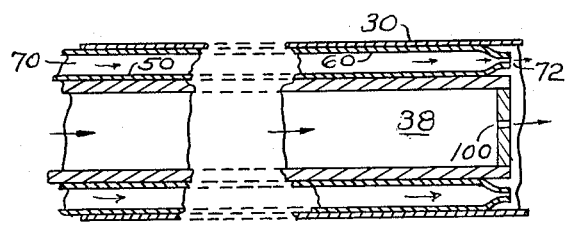
FIG. 7
INVENTOR.
Edward A. Stalker

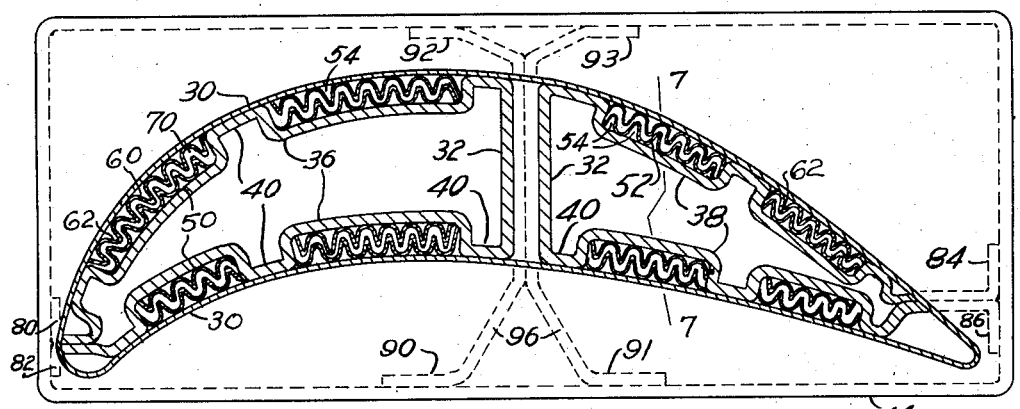
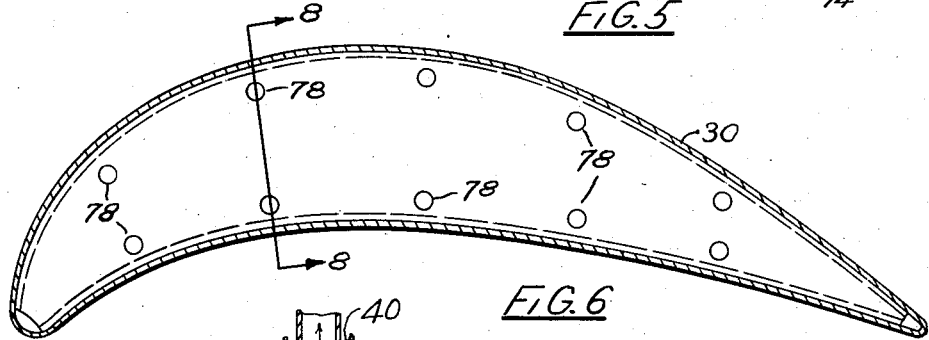
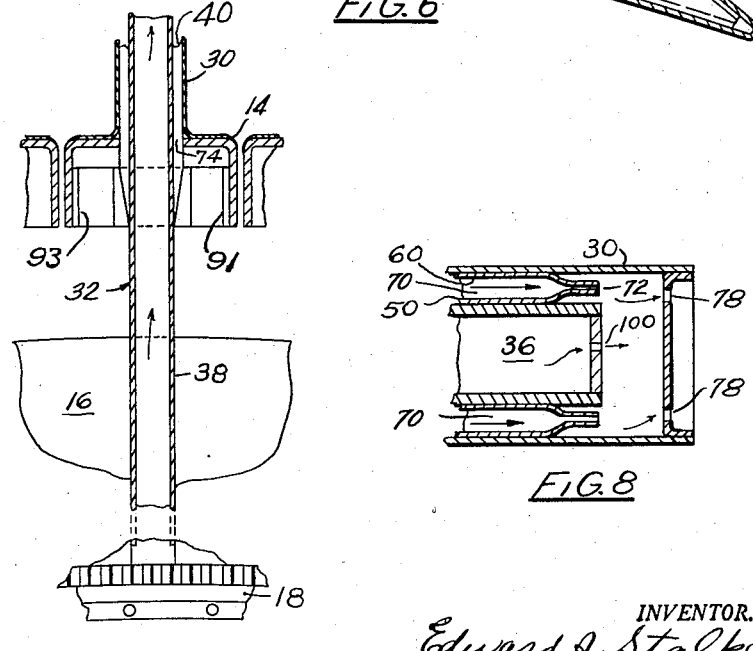

United States Patent Office 2,888,241
Patented May 26, 1959

2,888,241

FABRICATED COOLED TURBINE BLADES

Edward A. Stalker, Bay City, Mich., assignor to The Stalker Corporation, a corporation of Michigan Application June 9, 1954, Serial No. 435,465

9 Claims. (Cl. 253—39.15)

This invention relates to blades which are served with a coolant flow to maintain a lowered temperature in them.

An object of the invention is to provide a strut type blade wherein both the strut and skin are adequately cooled.

Another object is to provide a sheet metal turbine blade having substantial finning on both the skin and the strut to maintain selected temperatures at different localities of the blade.

Other objects will appear from the description, drawings and claims.

The above objects are accomplished by the means illustrated in the accompanying drawings in which—

Fig. 1 is a fragmentary axial front view of a turbine rotor according to this invention;

Fig. 2 is a fragmentary section on line 2—2 in Fig. 1;

Fig. 3 is a section on line 3—3 in Fig. 2;

Fig. 4 is a section on line 4—4 in Fig. 2 with fragments of the adjacent blade bases also shown;

Fig. 5 is a section on line 5—5 in Fig. 2;

Fig. 6 is a section of a blade looking toward its tip;

Fig. 7 is an enlarged sectional fragment of the blade skin and strut wall on line 7—7 in Fig. 5; and Fig. 8 is a fragmentary section on line 8—8 in Fig. 6.

Referring now to the drawings the turbine rotor is indicated generally as 10 in Fig. 2. It is comprised of the blades 12, the rim segments 14, the rotor disk 16, and the toothed clutch 18.

The blades 12 are comprised of the skin 30 (Fig. 5) enclosing the strut means 32. The strut means (Figs. 1, 2, 4 and 5) is preferably formed in two parts, namely the stems 36 and 38, each having spanwise splines 40 fixed to and supporting the skin. The splines 40 define between them a plurality of chordwise spaced flutes. Preferably the fixing is done by high temperature solder or fused metal.

Within said flutes and between each pair of splines, the corrugated sheets 50 are fused to the stem by high temperature solder (see Figs. 5, 7 and 8). Each passage 52 between the stem and the bead 54 of the corrugated sheet is a spanwise passage for conducting coolant to keep the stem cool. Each bead of the corrugated sheet may be regarded as forming a tubular stem fin spaced inward from the hot blade skin to protect it from absorbing heat from the skin.

Intermeshing with the corrugated sheet 50 and spaced from it is another corrugated sheet 60 fixed by fused metal to the inside surface of the skin. See Figs. 5 and 8. The beads 62 with the inside surface of the skin 30 are for conducting coolant spanwise to cool the skin. The sheet 60 prevents the heat absorbed by the flow of coolant from being readily transferred to the stem. The beads of the sheet 60 may be regarded as forming spaced tubular skin fins.

As shown particularly in Figs. 7 and 8, there is little flow through the spaces 70 between the corrugated sheets 50 and 60, because the radially outer ends of these sheets are brought together as at 72 in Fig. 8. They may be fixed together so as to prevent any spanwise flow between them but it is preferable to provide for a very small quantity to preclude the setting up of convective currents of hot fluid, gas or air, which would transfer heat from one sheet to the other.

By employing the two sets of corrugated sheets there are three layers of coolant between the skin and the stem through which the heat must travel. These represent very effective barriers to the flow of heat. If the corrugated sheets were absent, mixing activity in the coolant between the skin and the stem would transfer a relatively large amount of heat to the stem.

Opening means are provided at the root and tip ends of the blade for conducting coolant flows through the blades. See Figs. 4 and 8. The opening 74 in the root provides for admission of a coolant and openings 78 in the tip provides for its emission.

The fins fixed to the skin are free of fused metal contact with the stem and the fins of the stem are likewise free of the skin to preclude the conduction of heat from the skin to the stem.

As shown particularly in Figs. 4 and 8 there may also be a small flow of coolant through the interior of the stems 36 and 38, issuing from a hole 100 in the outer end of each stem as shown for stem 36 in Fig. 8. The coolant may enter each stem at such a locality as where it changes from a closed section as in Fig. 5 to the channel section shown in Figs. 1–4.

The rim segments are supported directly on the stems by the flanges 80 and 82 at the front of the blade and flanges 84 and 86 at the rear. These flanges are extensions of the two parts of the stem, as shown in Figs. 1 to 5.

The rim segments 14 are also supported by the side flanges 90—93 of the transverse members 96 passing between the stems 36 and 38 and fixed to them.

The radially inner parts of stems 36 and 38 are fixed to the rotor disk on its opposite sides. These parts are reduced in chordwise width converting them to open channel sections (Fig. 3) which can be readily spot welded and brazed to the disk.

The disk 16 is soldered to the flange 100 of the clutch.

Each of the stems 36 and 38 has a hollow interior preferably defined by sheet metal walls.

By making the blade parts of sheet metal they may be readily and cheaply produced from dies in large quantities by relatively unskilled workers.

It will now be clear that I have disclosed a uniquely cooled turbine blade adapted for maintaining the stem means at a very low temperature relative to the temperature of a hot motive gas bathing the skin on its outer surface. Since the stem is the main structural member it is important to keep it at such relatively low temperature.

While I have illustrated specific forms of the invention, it is to be understood that variations may be made therein and that I intend to claim my invention broadly as indicated by the appended claims.

I claim:

1. In combination in a cooled turbine blade, a sheet metal hollow stem means having a plurality of splines formed therein defining a plurality of chordwise spaced flutes between said splines, a sheet metal skin enclosing said stem means and fixed to said splines for support thereby, a plurality of chordwise spaced stem fins positioned in each said flute and fixed to the surface of said stem means by fused metal defining coolant flow passages directed spanwise along a major portion of the spanwise length of said stem means, said fins being spaced inward from said skin and free of fused metal contact therewith along the major spanwise length of each said fin, and means forming openings in the end wall of said blade in communication with said coolant flow passages for the flow of a coolant therethrough.

2. In combination in a cooled turbine blade, a sheet metal hollow stem means having a plurality of splines formed therein defining flutes between said splines, a sheet metal skin enclosing said stem means and fixed to said splines for support thereby a plurality of chordwise spaced stem fins positioned in each said flute and fixed to the surface of said stem means by fused metal, a plurality of chordwise spaced fins fixed to the inside surface of said skin and spaced from said stem fins defining coolant flow passages directed spanwise along a major portion of the spanwise length of said stem means, and means forming openings in the end wall of said blade in communication with said coolant flow passages for the flow of a coolant therethrough.

3. In combination in a cooled turbine blade, a sheet metal hollow stem means having a plurality of splines formed therein defining flutes between said splines, a sheet metal skin enclosing said stem means and fixed to said splines for support thereby, a plurality of chordwise spaced sheet metal stem fins positioned in each said flute and fixed to the surface of said stem means by fused metal, a plurality of chordwise spaced sheet metal skin fins fixed to the inside surface of said skin and spaced from said stem fins defining coolant flow passages directed spanwise along a major portion of the spanwise length of said stem means, and means forming openings in the end wall of said blade in communication with said coolant flow passages for the flow of a coolant therethrough.

4. In combination in a cooled turbine blade, a stem means having a plurality of splines spaced apart chordwise defining a plurality of chordwise spaced flutes therebetween, a skin enclosing said stem means and fixed to said splines for support thereby, and a plurality of chordwise spaced stem fins positioned in each said flute and fixed to the surface of said stem by fused metal defining coolant flow passages directed spanwise along a major portion of the spanwise length of said stem means, said fins being spaced inward from said skin and free of fused metal contact therewith along the major spanwise length of each said fin, and means forming openings in the end wall of said blade in communication with said coolant flow passages at their ends for the flow of a coolant thereinto and therethrough.

5. In combination in a cooled turbine blade, a stem means having a plurality of splines spaced apart chordwise defining flutes therebetween, a skin enclosing said stem means and fixed to said splines for support thereby, and a plurality of chordwise spaced stem fins positioned in each said flute and fixed to the surface of said stem by fused metal defining coolant flow passages directed spanwise along a major portion of the spanwise length of said stem, said fins being spaced inward from said skin, and a plurality of chordwise spaced skin fins fixed by fused metal to said skin defining coolant flow passages at the inside surface of said skin, said skin fins being spaced from said stem fins, said blade having opening means at an end thereof for the supply of a flow of coolant to said coolant flow passages for cooling said stem and skin.

6. In combination in a cooled turbine blade, a stem means having a plurality of splines spaced apart chordwise defining flutes therebetween, a skin enclosing said stem means and fixed to said splines for support thereby, and a plurality of chordwise spaced tubular stem fins positioned in each said flute and fixed to the surface of said stem by fused metal, said stem fins being spaced inward from said skin and extending spanwise with channels therebetween, a plurality of tubular skin fins extending spanwise and fixed to said skin, said skin fins being spaced apart chordwise and from said stem fins, said blade having opening means for the supply of a flow of coolant through the insides of said tubular fins.

7. In combination in a cooled turbine blade, a stem means having a plurality of splines spaced apart chordwise defining flutes therebetween, a skin enclosing said stem means and fixed to said splines for support thereby, and a plurality of chordwise spaced tubular stem fins positioned in each said flute and fixed to the surface of said stem by fused metal, said stem fins being spaced inward from said skin, and a plurality of tubular skin fins extending spanwise and fixed to said skin, said skin fins being spaced apart chordwise and from said stem fins defining a coolant flow space between said stem fins and said skin fins, said blade having opening means for the supply of a flow of coolant through said tubular fins and through said space.

8. In combination in a cooled turbine blade, a stem means having a plurality of splines spaced apart chordwise defining a plurality of chordwise spaced flutes therebetween, a skin enclosing said stem means and fixed to said splines for support thereby, and a plurality of skin fins extending spanwise and fixed to said skin on the inside surface thereof, said skin fins being positioned in said flutes and being spaced outward from said stem means, said fins being free of fused metal contact with said stem means to preclude conduction of heat to said stem means, said blade having opening means for the supply of a flow of coolant along the surfaces of said fins.

9. In combination in a cooled turbine blade, a stem means having a plurality of splines spaced apart chordwise defining a plurality of chordwise spaced flutes therebetween, a skin enclosing said stem means and fixed to said splines for support thereby, and a plurality of tubular skin fins extending spanwise and fixed to said skin on an inside surface thereof, said skin fins being positioned in said flutes and being spaced outward from said stem means, said fins being free of fused metal contact with said stem means to preclude conduction of heat to said stem means, said stem means having opening means for the supply of a flow of coolant through the insides of said tubular fins.

References Cited in the file of this patent

FOREIGN PATENTS

| | | |
|---|---|---|
| 625,693 | Great Britain | July 1, 1949 |
| 852,786 | Germany | Oct. 20, 1952 |